May 28, 1940. S. MYERSON 2,202,712
ARTIFICIAL TOOTH
Filed Oct. 5, 1936
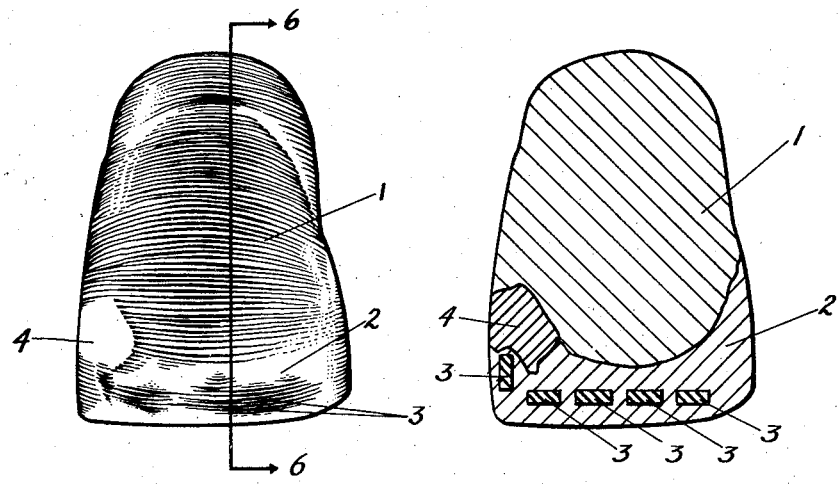
Fig. 1  Fig. 2
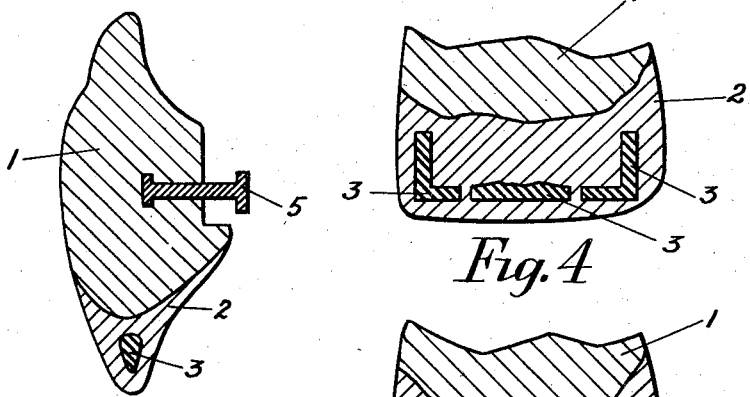
Fig. 3  Fig. 4
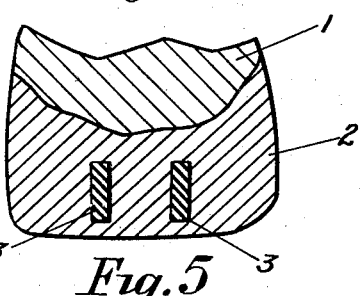
Fig. 5
Fig. 6  Fig. 7
Fig. 9  Fig. 8
Inventor
Simon Myerson Patented May 28, 1940

2,202,712

UNITED STATES PATENT OFFICE 2,202,712

ARTIFICIAL TOOTH

Simon Myerson, Brookline, Mass.

Application October 5, 1936, Serial No. 104,039

5 Claims. (Cl. 32—8)

This invention relates to artificial teeth and has for its principal object the obtainment of natural effects in such teeth. In particular it is an object of the invention to control light reflection effects in the finished tooth to an extent not heretofore possible by the usual practice of moulding slips made of blended porcelain-forming powders in a tooth mould or otherwise, as is the usual practice in making artificial teeth.

In the manufacture of such teeth, the body and enamel portions of the tooth are prepared by pulverizing the proper minerals and mixing them to produce porcelain-forming powders. These powders are then made ready for use by mixing them with solutions of gums or with starches, flours or the like, to form a plastic slip. The tooth mould usually consists of two parts; one part to form the labial face of the tooth, for example an anterior tooth; and the other part to form the lingual face and the ridge lap. The mould parts are provided with coacting dowel pins and corresponding sockets so that the two parts of the mould may easily and accurately be placed in registration. Suitable quantities or masses of enamel and body-forming slips respectively are then packed into the two parts of the mould and the mould parts are brought into registry with the assistance of the dowel pins, and pressed together until they are in firm contact with each other—a screw press usually being employed for this purpose. The closed mould is then put into a heater press where it is firmly held together while being heated and until the slip has become hard enough to permit the "green" tooth to be knocked from the mould. Thereafter the tooth is baked at such a temperature and for such a period of time as to cause the enamel-forming slip to fuse.

I prefer to employ a body-forming slip such that the body portion of the tooth is relatively opaque, and to use an enamel-forming slip such that the enamel layer or other portion of the tooth which consists of enamel is relatively translucent or even transparent. In accordance with the present invention I insert one or more solid bodies of predetermined size and shape (and of a material which is difficultly fusible so that it will not substantially alter in shape during the fusing operation) into the material which is to form the body or enamel portions of the tooth. I contemplate the use of pieces of one or more different qualities with respect to light penetration in the same tooth, and the use of pieces which may vary from actual transparency to a considerable opacity. These inserted solid bodies may be of any desired thickness, but are preferably so disposed in the slip material in the mould as to be completely surrounded by such slip material. By this means I can accurately control the appearance of the tooth at any given point since I can provide an area or areas of any desired degree of transparency or translucency by reason of the fact that the solid pieces substantially retain their shapes and original degrees of transparency during the burning of the tooth.

In accordance with one desirable procedure, the incisal edge portion and also, if desired, the lateral edges, or portions of such lateral edges, may be of substantially transparent colorless enamel. This enamel may constitute merely a surface layer or it may form a body of substantial dimensions constituting in effect a cap projecting well beyond the edge of the body portion and having lingual and labial surfaces of substantial extent. A tooth thus provided with a relatively opaque body portion and a transparent cap portion much more nearly simulates the natural tooth when viewed against the dark background of the oral cavity than do artificial teeth made in accordance with prior methods. In accordance with the present invention, I may embed a comparatively thin piece of solid material, as above referred to, in the slip which is to form the enamel, so as to change the transparency of the latter at a given point. I may also reproduce the effect, often found in natural teeth, of an opaque light colored area distinct from the surrounding portions of the tooth, by selecting a suitable ceramic piece, for example, a solid piece of porcelain of a color lighter than the body portion of the tooth which is to be made, and embed such piece in the slip in the mould so that it lies close to the labial face of the tooth where it is visible through the enamel. By following this practice I am able very accurately to predetermine the results to be obtained in the completed tooth. This is by no means possible by any other method, for it is very difficult and at best uncertain so to fuse an artificial tooth, made merely of plastic slips having different qualities, as to produce an opaque, semi-opaque or transparent area of definite shape and size and of a degree of transparency substantially different from that of the remainder of the tooth. Very slight variations in heat will affect the results, and cause failure in a high percentage of cases when it is attempted to produce such light reflection effects merely by moulding plastic slips.

In constructing a tooth according to my invention, the preformed and substantially infusible solid pieces do not lose their shapes nor overburn, although they become intimately fused with the remainder of the tooth. This practice has the further advantage of adding considerably to the strength of that part of the tooth in which the insert is embedded.

For the slip which forms the enamel cap I prefer to use material which yields a translucent enamel and then, by embedding a substantially transparent solid body therein, I can obtain gray or blue shadow effects at the surface when the tooth is viewed against the darkness of the oral cavity, whereas when it is held between the eye and a source of light the location of the transparent insert appears as a bright area.

It has been usual in the past when dentists sought to obtain similar imitations of natural teeth, for them to buy an artificial tooth of the size and shape desired and then by staining, to procure the effects. This not only requires a high degree of skill and consumes considerable time, but might often result in spoiling the tooth which was being so altered. Moreover, a very high degree of skill was required and because of the expense involved, this practice was very limited. By my construction, these hazards are eliminated and the cost of producing such a tooth reduced; also a very considerable improvement in the aesthetic results is achieved.

The invention will now be explained in connection with the accompanying drawing:

Fig. 1 is a labial view of an anterior tooth.

Fig. 2 is a vertical mesial distal section through the tooth shown in Fig. 1.

Fig. 3 is a vertical lingual section on the line 6—6 of Fig. 1.

Fig. 4 is a fragmentary section similar to Fig. 2, showing modifications.

Fig. 5 is a similar fragmentary section, showing another modification.

Fig. 6 is a perspective view of one form of a previously formed solid body used in the practice of my invention.

Fig. 7 is a similar view illustrating another shape of solid body which may be used, and Figs. 8 and 9 are several views of illustrating other shapes of solid body that may be used.

In accordance with a preferred embodiment of the invention the completed tooth comprises an opaque body 1 (Fig. 2) constituting the major part of the tooth and extending from the gingival surface of the tooth towards its incisal edge; a comparatively translucent body 2 of enamel extending beyond the edge of the body portion to such an extent as to have distinct lingual and labial faces (Fig. 3), and constituting in effect a downwardly tapering cap which forms the incisal portion of the tooth and which terminates at the incisal edge, said cap also forming the lateral corners of the tooth. This cap is of substantial depth so that the incisal edge is spaced from the proximate part of the body portion a distance which may, for example, be of the order of one-sixth or more of the entire depth of the tooth. Preferably the tooth also includes one or more inlaid solid bodies 3, usually embedded wholly within the material forming the incisal cap, as illustrated in Figs. 2 to 5, inclusive. However, the tooth may have such solid inserted pieces inset partly within the body portion and partly within the enamel portion, as illustrated at 4 in Fig. 1. The embedded pieces may be comparatively small, and as many as five or six or even more may be used in a single tooth to obtain the desired effects, several such pieces being shown in the tooth of Figs. 2 and 4. On the other hand, the embedded piece or pieces may be larger, as shown in Fig. 5, for example. In fact a single piece may be all that is required for some purposes. In Fig. 2 the inlaid solid bodies 3 are shown predominantly disposed with their longer edges horizontal. In Fig. 5, on the other hand, these pieces are shown with their longer edges vertically disposed. The inserted opaque piece 4 (Figs. 1 and 2) is preferably white or very light in color, and as illustrated this piece is laid partly in the body and partly in the enamel and very near to the labial face of the tooth but covered by the enamel so that it is visible through the enamel, thus giving the clouded effect often noticed in a natural tooth.

As shown in Fig. 3, the tooth may be furnished with any desired type of anchorage, such for example as a pin 5, embedded in the body portion of the tooth.

In Figs. 6 to 8 inclusive, various shapes of solid body for insertion in the material of the tooth during the moulding operation are illustrated by way of suggestion of the limitless number of shapes which may be used to obtain desirable effects.

As above described, in moulding the tooth the mould parts are supplied with their usual complements of plastic slip, and the previously prepared substantially infusible solid inserts 3 are embedded in the slip which is to form either the enamel, the body portion or both of the tooth, and then the tooth is completed in accordance with the usual procedure—the slips fusing during the final baking operation and becoming integrally joined with the solid inserts. However, the latter do not substantially change in shape, and thus impart their particular characteristics to that portion of the tooth in which they are embedded, thereby permitting the maker of the tooth to predetermine the exact location, shape and size of the area at which the contrasting color or other special effects are desired. As already pointed out, if the incisal portion, for example, of the tooth be of a translucent but not wholly transparent character, the embedding of a more transparent solid body in this portion results in a tooth which, when viewed against a light background, shows definite areas which are more transparent than the rest of the tooth, but which when viewed against the usual darkness of the oral cavity, appear as darker bluish or gray shadow-like areas. On the other hand, if the inserted elements are of relatively opaque material they form areas in which the color of these inserts may be more or less visible at the front of the tooth, and thus impart to the tooth the effects which it has heretofore been attempted to obtain by staining or otherwise treating a previously formed tooth.

While I have shown an artificial tooth, made of two slips blended into each other, I do not confine my invention to this limitation. A tooth might be constructed consisting of only one slip or of three or more without departing from the spirit of this invention. While I have shown only an anterior tooth with an anchorage pin, I do not limit my invention to anterior teeth or to teeth of any particular kind. My invention may be used with pin teeth or pinless teeth, with anterior or posterior teeth.

While I refer to the ceramic materials and porcelain powders I do not limit my invention to these materials.

Having thus described my invention, what I claim is—

1. An artificial tooth comprising a body portion of relatively opaque material, an incisal edge portion of a material which is relatively translucent, and a preformed body of predetermined size and shape, and of a material more transparent than said incisal portion, embedded in and completely surrounded by said incisal portion.

2. An artificial tooth having a body portion and an incisal cap portion, the incisal cap portion being of a material which is relatively translucent as compared with the body portion, and which projects beyond the edge of the body portion so as to have both labial and lingual surfaces, said incisal cap portion having within its boundaries substantially transparent premoulded bodies defining areas of predetermined size and shape which are more transparent than other parts of said incisal portion.

3. An artificial tooth of the kind having a body portion of relatively opaque material which constitutes the major part of the tooth and enamel forming the incisal edge of the tooth, part of a downwardly tapering mass of enamel which is relatively transparent as compared with the body-forming material and which constitutes the incisal portion of the tooth, characterized in that said mass of enamel is of substantial depth below the lower end of the body portion and further characterized in that the tooth has, within the outer boundaries of said incisal portion, solid, preformed inserts of predetermined size and shape embedded within the substance of the tooth and which are more transparent than other parts of the incisal portion whereby, when the tooth is viewed against the dark background of the oral cavity, said areas appear darker than the surrounding material.

4. An artificial tooth of the kind having a body portion of relatively opaque material which constitutes the major part of the tooth, and enamel forming the incisal edge of the tooth, said edge-forming enamel being an integral part of a downwardly tapering mass of enamel which is relatively transparent as compared with the body-forming material and which constitutes the incisal portion of the tooth, characterized in that said incisal portion is of substantial depth below the lower end of the body portion of the tooth, and being further characterized in having a preformed mass of material of predetermined size and shape, which is more transparent than the incisal portion, embedded in and completely surrounded by said incisal portion, said mass being located between the incisal edge and the proximate part of the body portion and appearing darker than the surrounding material when viewed against the background of the oral cavity.

5. An artificial tooth of the kind having a body portion of relatively opaque material which constitutes the major part of the tooth and enamel forming the incisal edge of the tooth, said edge-forming enamel being an integral part of a downwardly tapering mass of enamel which is relatively transparent as compared with the body-forming material and which constitutes the incisal portion of the tooth, said mass of enamel having an upward extension which overlies a portion at least of the labial face of the body portion, and a substantially opaque preformed solid mass, of a color different from that of the body portion and of limited size and predetermined shape, partially sunk in the labial side of the body portion of the tooth and which is visible through the upwardly extending portion of the enamel.

SIMON MYERSON.